United States Patent [19]
Trott

[11] Patent Number: 5,930,429
[45] Date of Patent: Jul. 27, 1999

[54] MICRO-PHOTONICS MODULE INTEGRATED ON A SINGLE SUBSTRATE

[75] Inventor: Gary R. Trott, San Mateo, Calif.

[73] Assignee: Hewlett-Packard Company, Palo Alto, Calif.

[21] Appl. No.: 08/886,347

[22] Filed: Jul. 1, 1997

[51] Int. Cl.[6] .................................................. G02B 6/42
[52] U.S. Cl. ............................ 385/93; 385/88; 385/35; 385/65
[58] Field of Search ................................ 385/35, 49, 88, 385/91, 93, 52, 65, 83, 89

[56] References Cited

U.S. PATENT DOCUMENTS

| | | | |
|---|---|---|---|
| 4,983,009 | 1/1991 | Musk | 385/35 |
| 5,124,281 | 6/1992 | Ackerman et al. | 437/209 |
| 5,181,216 | 1/1993 | Ackerman et al. | 372/36 |
| 5,291,572 | 3/1994 | Blonder et al. | 385/94 |
| 5,307,434 | 4/1994 | Blonder et al. | 385/91 |
| 5,367,589 | 11/1994 | MacDonald et al. | 385/37 |
| 5,420,953 | 5/1995 | Boudreau et al. | 385/88 |
| 5,439,782 | 8/1995 | Haemmerle et al. | 430/321 |
| 5,481,629 | 1/1996 | Tabuchi | 385/49 |
| 5,611,006 | 3/1997 | Tabuchi | 385/14 |
| 5,680,493 | 10/1997 | Naitoh | 385/51 |
| 5,748,822 | 5/1998 | Miura et al. | 385/90 |

FOREIGN PATENT DOCUMENTS

| | | | |
|---|---|---|---|
| 0 640 853 A1 | 3/1995 | European Pat. Off. | 385/14 |
| 2436908 | 2/1975 | Germany | 385/93 |
| 56-46203 | 4/1981 | Japan | 385/93 |
| 62-96912 | 5/1987 | Japan | 385/35 |

OTHER PUBLICATIONS

Loring Wirbel, "Lasers Light Way For All–Optical Network", Electronic Times, No. 942, Feb. 24, 1997, pp. 1 & 22.

Gengenbach, U., "Automatic Assembly of Microoptical Components", Microrobotics: Components and Applications, Boston, MA, Nov. 21–22, 1996, vol. 2906, pp. 141–150.

Blonder, G. E., "Silicon Optical Bench Research at AT&T Bell Laboratories", Lasers and Electro–Optics Society Annual Meeting Conference Proceedings, Boston, Nov. 4–9, 1990, vol. 2, No. 3, Nov. 4, 1990, pp. 350–353.

*Primary Examiner*—John D. Lee
*Assistant Examiner*—Juliana K. Kang
*Attorney, Agent, or Firm*—Marc R. Mayer

[57] ABSTRACT

An micro-photonics module includes an optical component and a photonics device mounted on a single substrate. The substrate defines a rectilinear cavity with flat bottom and flat side. The photonics device mounted on the substrate at a predefined distance from the cavity defines an optical path aligned to cross the rectilinear cavity. The optical component with portion abutting the flat bottom, flat side, and locator surface, is aligned with the optical path by the flat bottom and flat side of rectilinear cavity. The substrate may also define pyramidal cavity formed into the substrate from a major surface of the substrate, a notch formed in the substrate from the major surface and the flat side of the rectilinear cavity, and a locator surface within the rectilinear cavity. A ball lens may be seated in contact with the substrate within the pyramidal cavity to have a predefined relationship with the photonics device. The notch allows light to pass unobstructed between the ball lens and the optical component.

19 Claims, 6 Drawing Sheets

MICRO-PHOTONICS MODULE INTEGRATED ON A SINGLE SUBSTRATE

BACKGROUND OF THE INVENTION

1. Field of the Invention

The present invention relates generally to fiber optics or photonics modules and more particularly to micro-photonics modules having a high degree of precision and integrating many components onto a single substrate.

2. Description of the Related Art

Optical communications systems are widely used for carrying large amounts of information using light and optical fibers in place of the electric current and metal wires found in older communications systems. These optical communications systems can also carry greater amounts of information with lower data loss and lower cost over great distances than the older metal wire system. For this reason, considerable development has been done on components of optical communication systems, such as photonics packages or modules.

Photonics generally refers to devices that have both electronic and optical attributes. Photonics modules include the optical parts necessary to transmit, receive, or process the light that carries the information through the optical fiber. The photonics devices that are part of the photonics modules include lasers, which generate coherent light in response to an electronic signal, and photo detectors, which generate an electronic signal in response to light. These are the devices typically used to transmit, receive, and process the optical information that travels along the optical fibers. These photonics devices, however, cannot work efficiently without the help of other optical parts that together make up the photonics module.

Typically, photonics modules use edge-emitting semiconductor lasers for transmitting, and surface-detecting photo detectors for receiving, the light that carries the information through the optical fibers. Edge-emitting lasers have a relatively wide radiation angle, however. The radiation angle is the angle of the "cone" of light that radiates from the edge-emitting laser. Therefore transmitter modules typically have a lens inserted between the laser and the optical fiber for focusing the laser light to obtain high efficiency in optical coupling. Likewise, light leaving an optical fiber has a radiation angle. Thus, a lens is also typically inserted between the optical fiber and a surface-detecting photo detector in a receiver module for focusing the light to obtain high coupling efficiency. Using a lens has the additional benefit that it enables the distance between different elements of the photonics modules to vary from module to module according to the design objectives.

Other optical components, such as filters, isolators, or mirrors may also be inserted between the edge-emitting laser and the optical fiber in a transmitter module. These components may serve many functions depending on the design and intended function of the specific photonics module. For example, it is desirable to insert an optical isolator between the laser and the optical fiber. The optical isolator allows the laser light to pass freely through in one direction on its way to an optical fiber, but prevents laser light coming from the optical fiber from returning to the laser. Similarly, other optical components may be inserted between the photo detector and the optical fiber in a receiver module.

In a photonics module it is desirable that the laser, lens, optical component and optical fiber be in a precise predetermined alignment with one another. Likewise, it is desirable for the optical fiber, lens, optical component and photo detector to be in a precise predetermined alignment with one another in the receiver module. To achieve this precise alignment, three-dimensional fixtures or mounts are typically needed to hold the components in place and in alignment with one another.

One disadvantage of such conventional photonics modules or packages is that the fixtures are costly to fabricate because they require relatively high precision. Another disadvantage is that assembling the components of the photonics modules into precise positions using the fixtures is time consuming, which causes low throughput in production. In addition, considerable time and care may also be needed for alignment and adjustment while assembling the photonics modules. Finally, the modules must be completely assembled into their final packaging before they can be tested. This limits the ability of the photonics modules to be inexpensively mass produced by operators having a moderate level of skill. It also results in the production of unserviceable modules. These factors typically prevent the production of low-cost photonics modules.

One way has been developed to keep a lens and a photonics device in a precise and predetermined alignment, solving many of the previously experienced problems. In copending U.S. patent application Ser. No. 08/705,867, titled "An Improved Micro-Photonics Module," now U.S. Pat. No. 5,771,323 assigned to the assignee of the present invention and incorporated herein by reference, there is described a pyramidal cavity, including a frustopyramidal cavity, precision formed in a mounting member. The purpose of the pyramidal cavity is to precisely locate a ball lens. The ball lens is set in the cavity in precise alignment with the photonics device.

When optical components, such as filters, isolators, or mirrors are desired in the photonics module, however, specialized fixtures are needed to keep the optical component precisely aligned with the lens, the photonics device, and the optical fiber. Thus, photonics modules including optical components have many of the same disadvantages as the conventional photonics modules that required specialized fixtures.

SUMMARY OF THE INVENTION

The invention eliminates the above-described difficulties of micro-photonics modules by mounting all of the optical parts on a single substrate. More specifically, the invention provides a micro-photonics module, including an optical component, that can be easily and inexpensively produced with precise positioning and alignment of the photonics device, optical component, and ball lens without the need for active alignment. These benefits have been achieved by the micro-photonics module according to the invention in which various surfaces and cavities formed in a substrate passively align the various optical parts of the photonics module.

Specifically, the micro-photonics module according to the invention comprises a substrate, a photonics device, and an optical component. The substrate has a major surface and defines a rectilinear cavity that extends into the substrate from the major surface. The rectilinear cavity has a flat bottom and a flat side. The photonics device is mounted on the major surface of the substrate in a predefined alignment relative to the rectilinear cavity. The photonics device defines an optical path extending across the rectilinear cavity from the photonics device substantially parallel to the major surface of the substrate. The optical component has portions that abut the flat bottom and flat side of the rectilinear cavity.

The flat bottom and flat side align the optical component relative to the optical path. The flat bottom aligns the optical component in a first direction perpendicular to the flat bottom and the flat side aligns the optical component in a second direction perpendicular to the flat side.

In the micro-photonics module according to the invention, the photonics device may be a semiconductor laser or a semiconductor photo detector; the optical component may be an optical filter, an optical isolator, a mirror or a lens, and the optical component may be bonded to the flat bottom or flat side of the rectilinear cavity.

The substrate may also define a locator surface within the rectilinear cavity. The locator surface contacts the optical component and aligns the optical component in a third direction perpendicular to both the first direction and the second direction. The substrate preferably further includes crystalline silicon with the major surface of the substrate being a <100> crystallographic plane and the locator surface being a <111> crystallographic plane.

The substrate may also define a pyramidal cavity, including a frustopyramidal cavity, that extends into the substrate from the major surface. The pyramidal cavity is located so that it is crossed by the optical path and is preferably aligned so that the optical path crosses along a diagonal of the pyramidal cavity. It is also preferable that the substrate includes crystalline silicon with the major surface of the substrate being a <100> crystallographic plane and pyramidal cavity bounded by <111> crystallographic planes.

The micro-photonics device according to the invention may additionally comprise a ball lens. The ball lens is set in the pyramidal cavity and contacts the substrate at three or more contact points located within the pyramidal cavity. The contact points locate the ball lens in a predefined relationship with the optical path. The ball lens may be bonded to the substrate.

The substrate may further define a notch that extends into the substrate from the major surface and from the flat side of the rectilinear cavity. The notch is located so that it is crossed by the optical path. It is also preferable that the substrate includes crystalline silicon with the major surface of the substrate being a <100> crystallographic plane and the notch bounded by <111> crystallographic planes.

Other features and advantages of the present invention will become apparent from the following detailed description, taken in conjunction with the accompanying drawings, illustrating, by way of example, the principles of the invention.

DETAILED DESCRIPTION OF THE INVENTION

Figure 1:
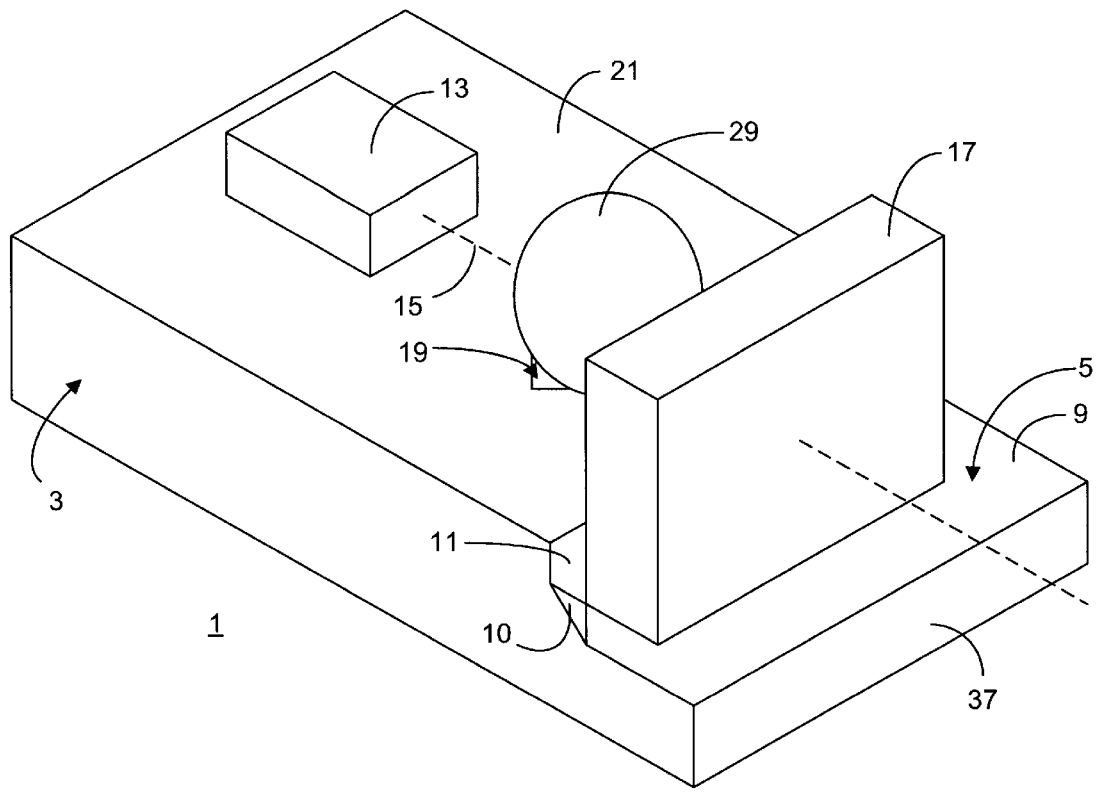
FIG. 1 is a perspective view of a preferred embodiment of a micro-photonics module according to the invention showing the alignment of the optical component, ball lens, and photonics device in relation to the optical path.

As shown in the drawings, the invention is embodied in a micro-photonics module assembled on a single substrate, where various topographic features of the substrate precisely align an optical component and a ball lens along an optical path defined by a photonics device.

The micro-photonics module according to the invention includes a substrate having a major surface and defining a pyramidal cavity and a rectilinear cavity that extend into the substrate from the major surface. The rectilinear cavity has a flat bottom and a flat side. The rectilinear cavity and pyramidal cavity robustly hold and precisely align a ball lens and an optical component, respectively. The substrate can also define a notch extending into the substrate from the major surface and the flat side of the rectilinear cavity to allow light to pass unobstructed between the lens and the optical component. The micro-photonics module according to the invention embodies the invention offers the advantage of easy bulk manufacture at a significantly lower cost and with far less skilled labor than modules known in the art. In the micro-photonics module according to the invention, the topological features of the substrate enable the ball lens and optical component can be repeatably aligned with great precision and minimal effort due to the topographic features of the substrate. The micro-photonics module according to the invention has the further advantage of being smaller than known micro-photonics modules. Additionally, they may be easily tested prior to assembly into their final packaging.

In the following detailed description and in the drawings, like elements are identified with like reference numerals.

Figure 2:
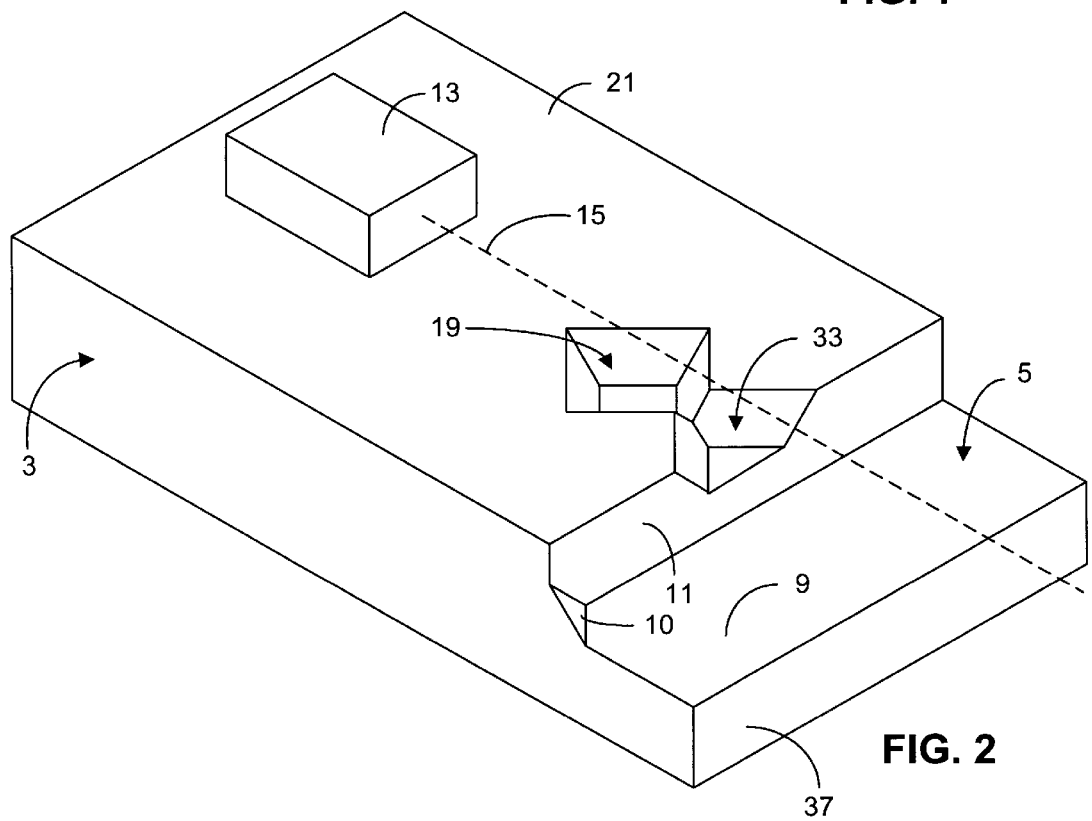
FIG. 2 is a perspective view of the preferred embodiment of FIG. 1, with the optical component and ball lens removed for clarity.
Figure 3:
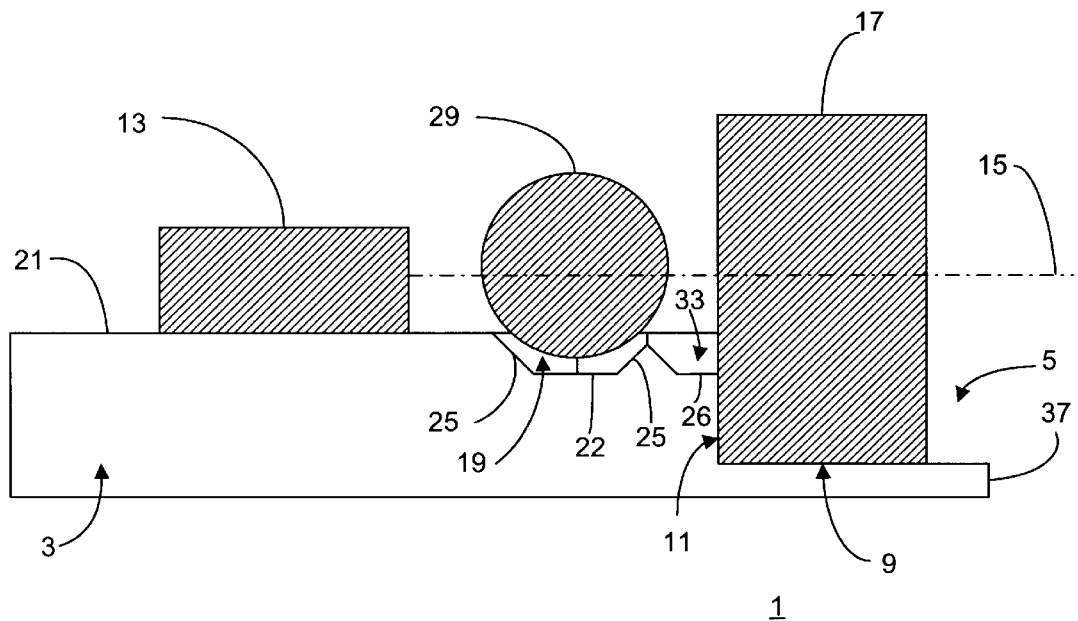
FIG. 3 is a cross sectional side view, taken along the optical path, of the micro-photonics module as depicted in FIG. 1.
Figure 4:
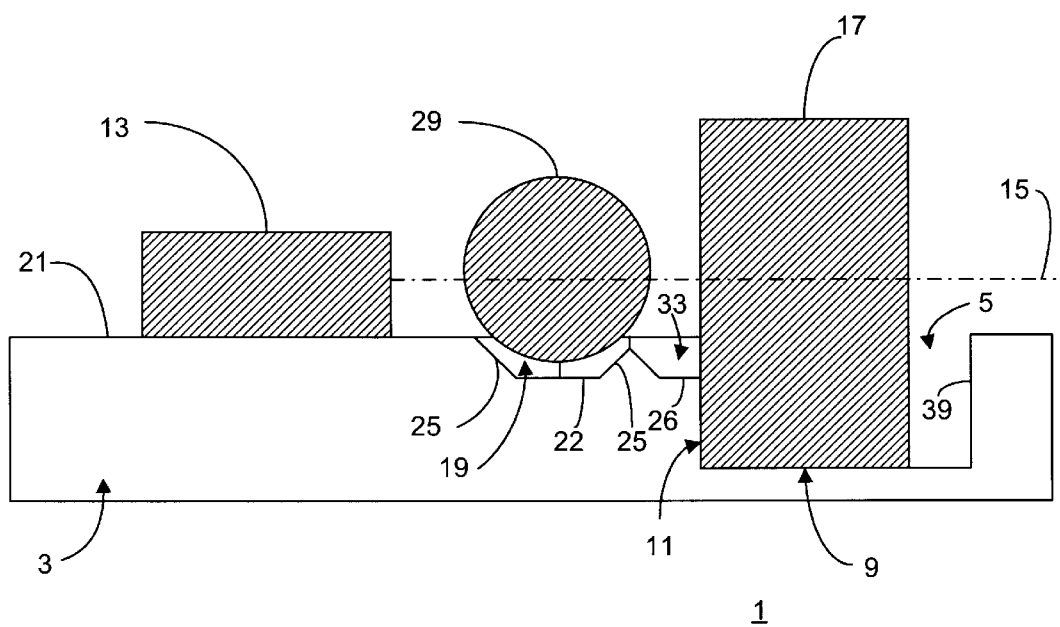
FIG. 4 is a cross sectional side view, taken along the optical path, of a second embodiment of a micro-photonics module according to the invention.

In FIGS. 1–3, a micro-photonics module 1 according to a preferred embodiment of the invention is depicted. The micro-photonics module according to the invention includes a substrate 3 having a major surface 21 into which a rectilinear cavity 5 is formed. The rectilinear cavity is bounded by a flat bottom 9 and a flat side 11. The rectilinear cavity 5 may extend to the edge 37 of the substrate 3 as shown in FIG. 3 or may be bounded by a second side surface 39 as shown in FIG. 4 which depicts a second preferred embodiment.

The rectilinear cavity 5 may be mechanically formed in the substrate 3, however in the preferred embodiment, the material of the substrate 3 is crystalline silicon which allows the substrate 3 to be formed using a photo-lithographic mask and etch process such as is used in fabricating semiconductor integrated circuits. This further allows the features formed in the substrate 3 to possess a great deal of dimensional and positional accuracy. Additionally, a large number of the substrate 3 can be made from a single silicon wafer using batch processing, thus further reducing the fabrication costs of the substrate 3. In the preferred embodiment of the invention, the crystallographic planes of the crystalline silicon material of the substrate 3 are aligned such that the major surface 21 of the substrate 3 is a <100> crystallographic surface. As used here, a <100> crystallographic surface means a <100> crystallographic surface or an equivalent crystallographic surface, including <010>, <001>, <$\bar{1}$00>, <0$\bar{1}$0> and <00$\bar{1}$> crystallographic surfaces.

Figure 5:
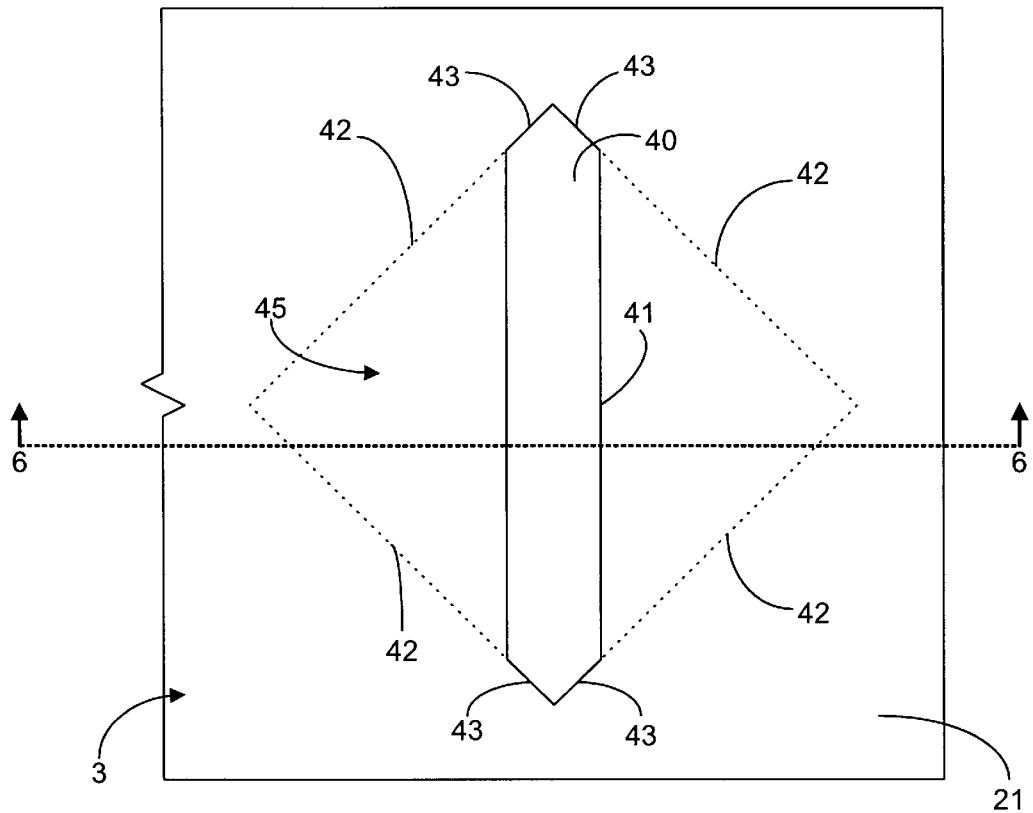
FIG. 5 is a detail top view of a portion of the substrate showing the alignment of an etching mask with the crystalline structure of the substrate.
Figure 6:
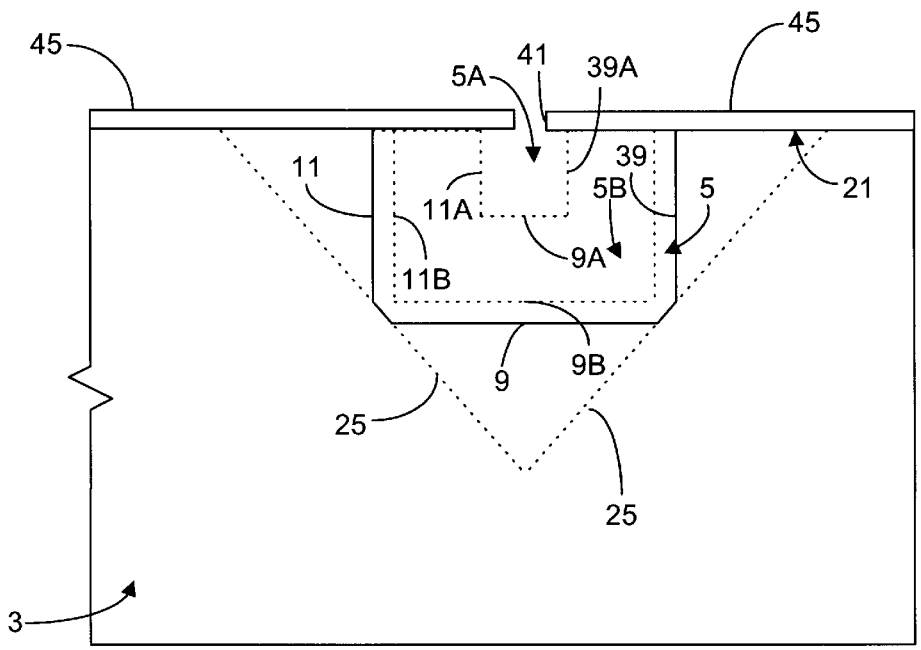
FIG. 6 is a side sectional view of the portion of the substrate shown in FIG. 5 taken along line "6—6" of FIG. 5 showing the etching process.
Figure 7:
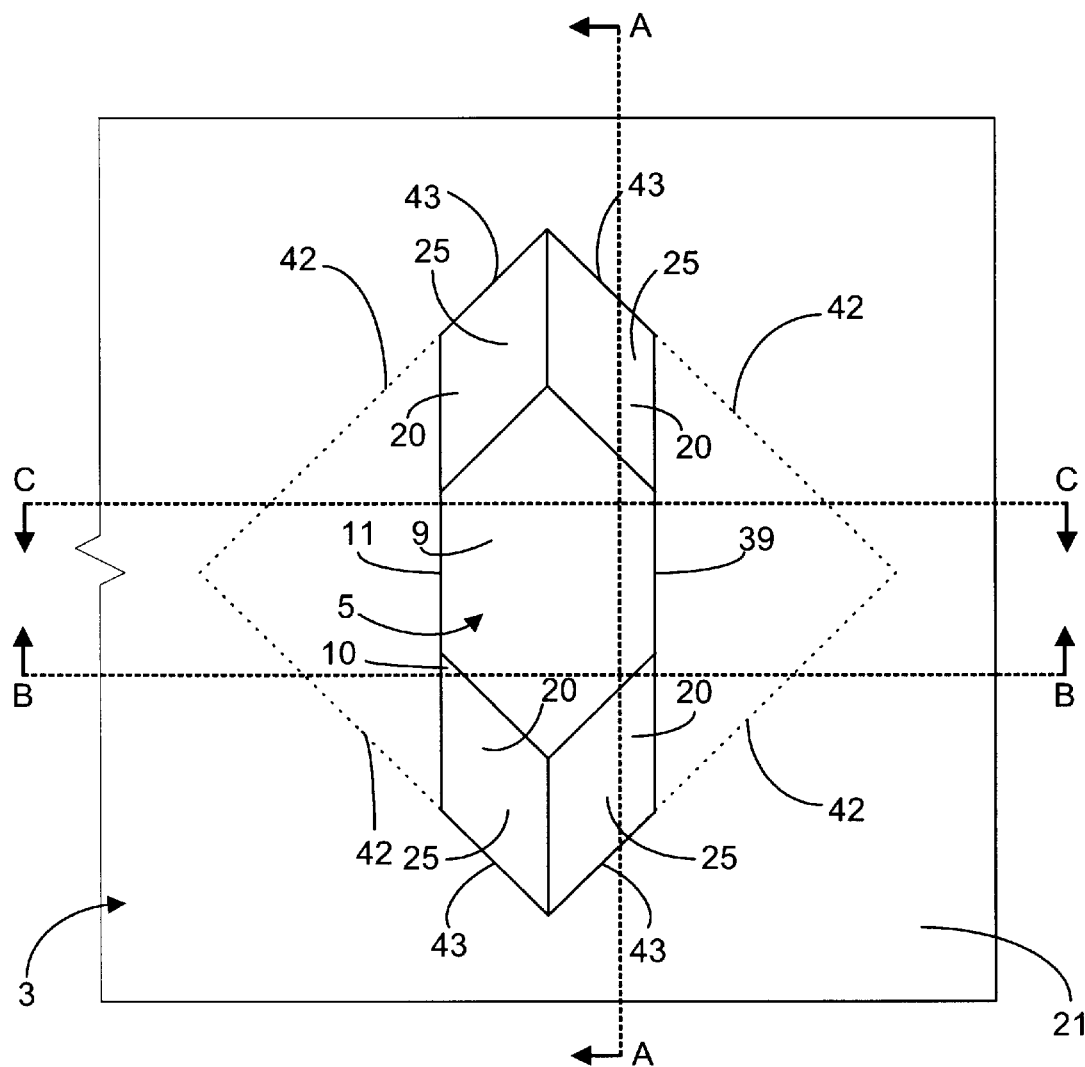
FIG. 7 is the same view as in FIG. 5, with the mask removed showing the rectilinear cavity formed.

FIGS. 5 through 7 depict the substrate 3 showing one possible etching technique for forming the rectilinear cavity 5. A photo-lithographic mask 45 formed on the major surface 21 of the substrate 3 has an oblong hexagonal opening 41. The mask protects the major surface 21 directly below it from contact with an anisotropic etchant such as potassium hydroxide (KOH). The oblong hexagonal opening 41 allows the anisotropic etchant to freely contact an exposed portion 40 of the major surface located directly below the hexagon defined by the oblong hexagonal opening 41. Preferably the mask 45 is arranged on the major surface 21 such that the short sides 43 of the oblong hexagonal opening 41 are aligned with intersections 42 of the <111> crystallographic planes 25 with the <100> crystallographic plane of the major surface.

When the anisotropic etchant is applied to the exposed portion 40 of the major surface 21 through the oblong hexagonal opening 41 in the mask 45, it will etch quickly into the silicon material of the substrate 3 in the direction of the <100> crystallographic planes to form the flat bottom 9 and flat side 11 of the rectilinear cavity 5, but will etch only very slowly into silicon in the direction of the <111> crystallographic planes 25 that intersect the <100> crystallographic plane of the major surface 21 at short sides 43. As shown in FIG. 7, the portions of the <111> crystallographic planes 25 that are exposed by the etchant will form the ends 20 of the rectilinear cavity 5. The speed of the anisotropic etching into <100> crystallographic planes can be, for example, 1000 times greater under some conditions than the speed of etching into the <111> crystallographic planes. In other words, the <111> crystallographic planes 25 effectively serve as an etch stops in this type of photolithographic etching process.

FIG. 6 shows the substrate 3 in cross sectional view. A small rectilinear cavity 5A is formed in the substrate shortly after the enchant is applied. The rectilinear cavity 5A has flat side 11A and flat bottom 9A that are respectively perpendicular and parallel to the major surface 21 of the substrate 3. In addition small rectilinear cavity 5A has a second flat side 39A. Since the major surface 21 is a <100> crystallographic plane, the flat bottom 9A and flat side 11A also are <100> crystallographic planes.

As the etching process progresses, a larger rectilinear cavity 5B is formed with flat side 11B and flat bottom 9B. The flat bottom 9B and flat side 11B are likewise <100> crystallographic planes. If the enchant is allowed to work long enough, the flat side 11 and flat bottom 9 will eventually reach the <111> crystallographic planes 25. Once the <111> crystallographic planes 25 are reached, etching in the direction of the <111> crystallographic planes 25 effectively stops. In forming the rectilinear cavity 5, the etching process must be stopped when the flat side 11 has reached the dimension required by the design of the photonics module 1. After the rectilinear cavity 5 has been formed, the mask 45 may be removed from the major surface 21 of the substrate 3. The rectilinear cavity at will appear as shown in FIG. 7.

As shown in FIG. 7, the substrate 3 may then be sliced through along lines "A—A," "B—B," and "C—C" with the portion of substrate retained being indicated by the arrows. The three slices indicated by lines "A—A," "B—B," and "C—C" remove any unneeded substrate 3, and particularly removes ends 20. This minimizes the size of the substrate and of the micro-photonics device according to the invention. Slicing along line "A—A" removes the second flat side 39. In slicing along "B—B" it is preferable to leave a small portion of one <111> crystallographic plane 25 within the rectilinear cavity. As will be shown below, it is beneficial to leave at least one <111> crystallographic plane 25 partially exposed within the rectilinear cavity 5 to provide the locator surface 10. Alternatively, all or some of the slicing can be omitted.

The embodiment of the micro-photonics module shown in FIGS. 1–3 also includes the photonics device 13. The photonics device 13 is the component of the micro-photonics module that converts light into electricity or, conversely, electricity into light. The photonics device 13 is usually either a semiconductor laser, which generates coherent light in response to an electric signal, or a semiconductor photo detector, which generates an electric signal in response to light. In the micro-photonics module according to the invention, the photonics device 13 is mounted on the substrate 3 at a predefined distance from the rectilinear cavity 5. The bonding and electrical connection of such photonics devices to a substrate is known in the art and may be done using a solder paste technique. The photonics device 13 defines the optical path 15, and the photonics device 13 is aligned such that the optical path 15 is substantially parallel to the major surface 21 of the substrate 3 and crosses the rectilinear cavity 5. Normally, the optical path will cross the rectilinear cavity at an angle substantially perpendicular to the flat side 11, but with some optical components 17 it is desirable that the optical path cross the rectilinear cavity at an angle which is not substantially perpendicular to the flat side.

Figure 8:
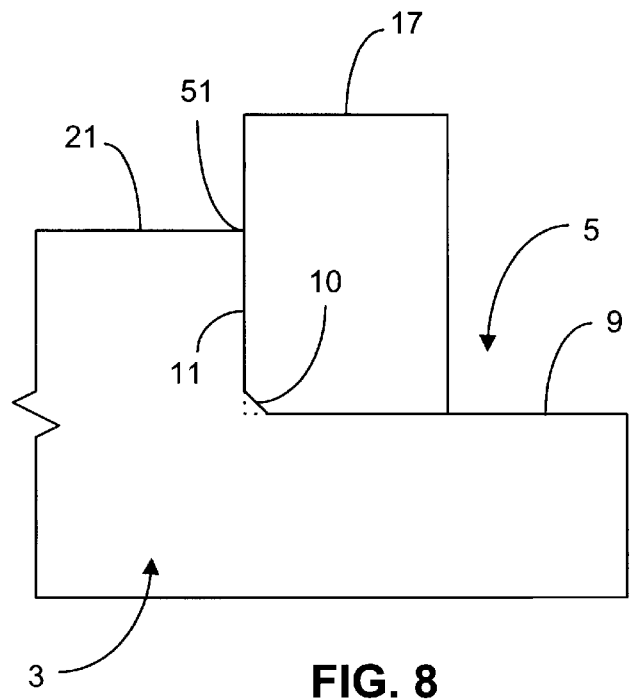
FIG. 8 is a detail view of the portion of the substrate defining the rectilinear cavity in the embodiment of FIG. 1 of the micro-photonics module according to the invention as viewed from the side with the optical component in place.
Figure 9:
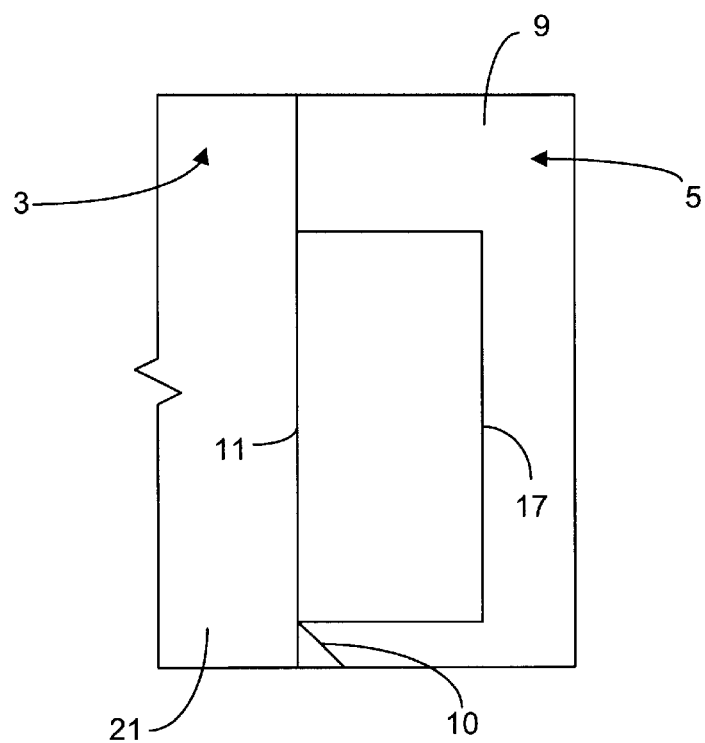
FIG. 9 is a detail top view of the portion of the substrate defining the rectilinear cavity shown in FIG. 8.

The photonics module 1 also includes the optical component 17. The optical component 17 is any device designed to act upon light in some way. Examples of optical components 17 are optical filters, optical isolators, mirrors and lenses. In the micro-photonics module according to the invention, the optical component 17 includes a portion that abuts the flat bottom 9 of the rectilinear cavity 5 and a portion that abuts the flat side 11 of the rectilinear cavity 5. It is preferable that the portions of the optical component that abut the flat bottom and the flat side of the rectilinear cavity be substantially flat. The flat bottom 9 and flat side 11 align the optical component 17 in a predetermined relationship with the photonics device 13, usually so that the optical path 15 contacts the optical component 17. The exact location of the optical component 17 relative to the major surface 21 is controlled by the position of the flat bottom 9. Thus the flat bottom 9 controls the position of the optical component 17 in a first direction, perpendicular to the flat bottom 9. Similarly, the exact distance of the optical component 17 from the photonics device 13 is controlled by the flat side 11. Thus the flat side 11 controls the position of the optical component 17 in a second direction, perpendicular to the flat side. If high precision is needed to locate the optical component 17 in a third direction, i.e., perpendicular to the first direction and perpendicular to the second direction, alignment in this third dimension can be accomplished by using a locator surface 10 that is also defined by the substrate 3. The locator surface 10 is a portion of the substrate 3 that projects into the rectilinear cavity 5. In the preferred embodiment, the locator surface 10 is a portion of a <111> crystallographic plane 25 that is left projecting into the rectilinear cavity by the photolithographic etching process described above. The locator surface 10 is depicted in more detail in FIG. 8 and FIG. 9.

By aligning the optical component 17 in the rectilinear cavity 5 in such a way that it abuts not only the flat side 11 and flat bottom 9, but also abuts the locator surface 10, the position of the optical component 17 can be precisely located in the first, second and third directions. Once the optical component 17 is aligned, it is bonded to the rectilinear cavity 5 at the flat bottom 9 or the flat side 11 to permanently hold it in place. In addition, if there is ever a need to replace the optical component 17, a replacement optical component can be installed in the micro-photonics module 1 in the same precise position with a minimum amount of skill by simply placing the replacement optical component in the rectilinear cavity 5 such that it abuts the flat side 11, flat bottom 9 and locator surface 10.

As shown in FIGS. 1–4, the substrate 3 also defines the pyramidal cavity 19, that extends into the substrate from the major surface 21 of the substrate. In this disclosure, the term pyramidal cavity may include either a pure pyramidal cavity or a frustopyramidal cavity as shown in the Figures. The pyramidal cavity is located so that it is crossed by the optical path 15. Furthermore, the pyramidal cavity 19 is preferably aligned so that the optical path 15 crosses the pyramidal cavity 19 along a diagonal 27 of the pyramidal cavity 19. It is also preferred that the pyramidal cavity 19 be located between the rectilinear cavity 5 and the photonics device 13.

Like the rectilinear cavity 5, the pyramidal cavity 19 can be formed mechanically in the substrate 3. In the preferred embodiment, however, the pyramidal cavity 19 is formed using a photo-lithographic etching process much in the same manner as described above for the creation of the rectilinear cavity 5 as shown in FIG. 5 and FIG. 6. In the case of the pyramidal cavity 19, however, rather than stopping the etching process when a rectilinear cavity 5 of the proper dimensions is formed, the etching process is allowed to continue until it exposes portions of the <111> crystallographic planes 25. It is preferred that the pyramidal cavity be a frustopyramidal cavity with the pyramidal cavity truncated at the flat surface 22 substantially parallel to the major surface 21. This is accomplished by stopping the etching process once the pyramidal cavity 19 has achieved the desired depth. Alternatively, as described above, the <111> crystallographic planes effectively act as an etch stop, so the etching process can be allowed to continue until it stops, with no precise timing needed for this etching process. In addition, no slicing of the substrate 3 is required to define the shape of the pyramidal cavity 19. The size and location of the pyramidal cavity 19 is precisely defined by the size and position of a second oblong hexagonal opening similar to the oblong hexagonal opening 41 in the mask 45.

In crystalline silicon, the <111> crystallographic planes intersects the <100> crystallographic planes at approximately 54.7 degrees. Therefore, when the major surface 21 of the substrate 3 lies on the <100> crystallographic plane, the pyramidal cavity 19 extends into the substrate 3 from the major surface 21 at an angle of 54.7 degrees. If the major surface 21 of the substrate 3 does not lie along the <100> crystallographic planes, then the angle at which the <111> crystallographic planes intersect the major surface 21 would be at 54.7 degrees plus the angle between the <100> crystallographic plane and the plane of the major surface 21.

The <111> crystallographic planes 25 of the pyramidal cavity 19 precisely define the interior of the pyramidal cavity 19, causing the pyramidal cavity 19 to be precision-formed with accuracies that are within micron and even sub-micron range.

Figure 10:
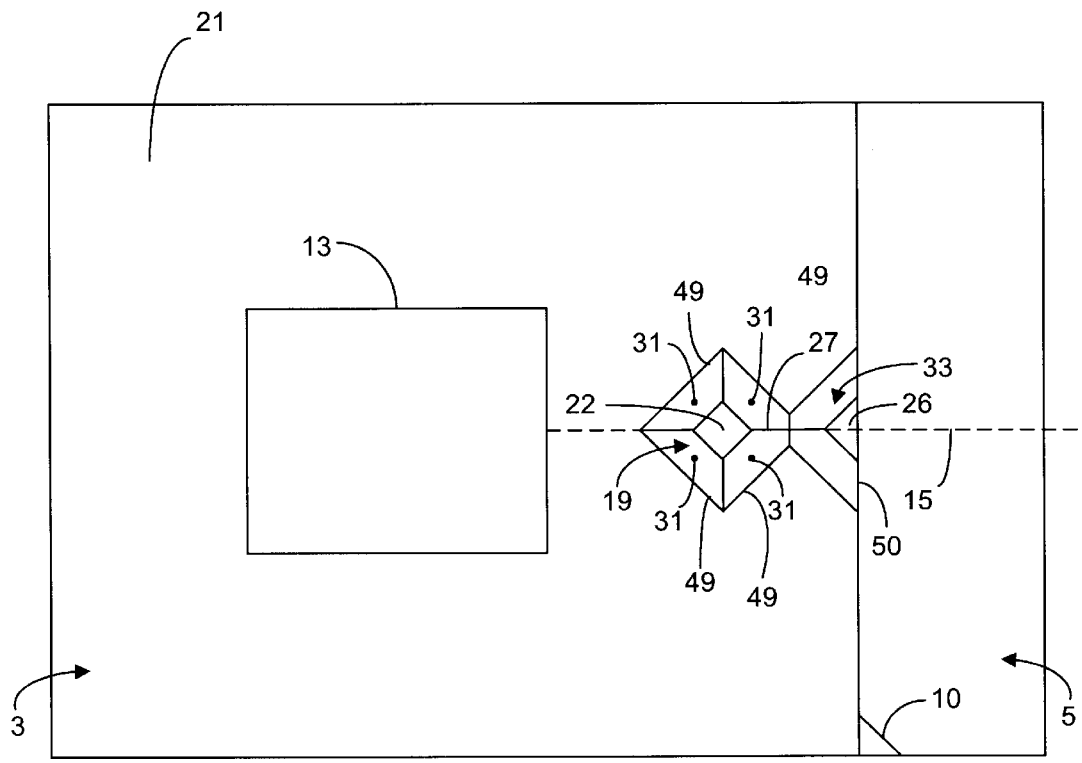
FIG. 10 is a plan view of the embodiment of the micro-photonics module according to the invention depicted in FIG. 2.

As shown in FIG. 1, the micro-photonics module 1 also includes the ball lens 29. The ball lens 29 contacts the substrate 3 at three or more contact points 31 within the pyramidal cavity 19. These contact points are shown in FIG. 10. When the ball lens 29 is seated in the pyramidal cavity 19, the pyramidal cavity 19 defines the three-dimensional position of the ball lens 29 with the same accuracy with which the pyramidal cavity 19 is defined, which is based on standard photo-lithographic processes. Thus the contact points 31 within the pyramidal cavity 19 locate the ball lens 29 in a predefined relationship with the photonics device 13 and the optical component 17. Once the ball lens 29 is in contact with the substrate 3 within the pyramidal cavity, it can be bonded to the substrate to permanently hold it in this predefined relationship with the photonics device 13. It is preferred that the ball lens be bonded to the flat surface 22 within the pyramidal cavity.

Preferably, the opening of the pyramidal cavity 19 is substantially square. The opening edges 49 are located at the intersection of the pyramidal cavity 19 and the major surface 21 of the substrate 3. The opening edges 49 also correspond to the intersections 42 of the <111> crystallographic planes 25 with the <100> crystallographic plane of the major surface 21. Preferably the size of opening of the pyramidal cavity 19 is larger than that of the ball lens 29. Thus, when the ball lens is seated in the pyramidal cavity 19, the ball lens contacts the substrate 3 at contact points 31 located within the pyramidal cavity and does not contact the opening edges 49 of the pyramidal cavity 19 or the flat surface 22. As is known, a plane is more robust than an edge. An edge is fragile and difficult to form. If an edge is not properly formed or is chipped away, the contact points with the ball lens may move. This may cause the location of the ball lens to shift from the predefined location. In addition, the edge contact points typically cannot confine a spherically-shaped object unless the pyramidal opening is precisely square. These problems disappear when the ball lens 29 contacts the substrate 3 within the pyramidal cavity at the contact points 31.

Alternatively, the size of the pyramidal cavity 19 may be such that the ball lens 29 contacts the opening edges 49 of the pyramidal cavity 19 when seated in the pyramidal cavity 19.

Also as shown in FIGS. 1–3, it may be desirable for the substrate 3 additionally to define a notch 33 that extends into the substrate 3 from the major surface 21 and the flat side 11 of the rectilinear cavity 5. The notch should be located so that it is crossed by the optical path 15. The notch 33 allows light to pass between the ball lens 29 and the optical component 17 without obstruction. As with the rectilinear cavity and pyramidal cavity described above, the notch may be formed mechanically, but preferably the substrate 3 is made of crystalline silicon, allowing the substrate 3 to be photo-lithographically masked and etched as is widely used in fabricating semiconductor integrated circuits. This further allows the size and position of the notch 33 to be defined in the substrate 3 with great accuracy. Additionally, a large number of the substrate 3 can be made from a single silicon wafer using batch processing, thus further reducing the fabrication costs of the substrate 3.

Figure 11:
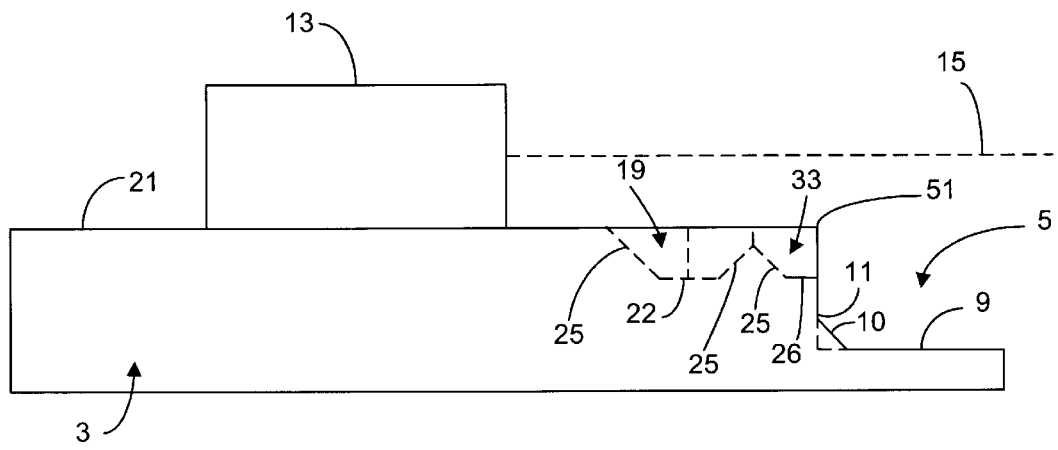
FIG. 11 is a side view of the micro-photonics module according to the invention as depicted in FIG. 10.

FIGS. 10 and 11 show that in the preferred embodiment of the micro-photonics module according to the invention, the notch 33 takes the form of one half of a pyramidal cavity, having its diagonal 50 aligned at the intersection 51 of the flat side 11 and the major surface 21. As noted above, in this disclosure the term pyramidal cavity may include either a pure pyramidal cavity or a frustopyramidal cavity as shown in the Figures. Alternatively, the notch may take the form a rectilinear cavity similar to rectilinear cavity 5. The notch 33 is also centered on the optical path 15. This allows the <111> crystallographic planes 25 to bound the notch 33. The notch may additionally be bound by a flat surface 26. Thus, the notch 33 can be formed using the same photo-lithographic etching process as described above for forming the pyramidal cavity 19. Alternatively, the notch can be formed using the process described above for forming the rectilinear cavity, or some combination of the process for forming the rectilinear cavity 5 and the process for forming the pyramidal cavity. In addition, the same mask 45 can be used to simultaneously locate the notch, the pyramidal cavity, and the rectilinear cavity 5.

Alternatively, prior to forming the rectilinear cavity 5 in the substrate 3, the pyramidal cavity 19 and a second pyramidal cavity similar to pyramidal cavity 19 may be formed in the substrate 3 using the same photo-lithographic etching process described above. Then, the mask 45 is positioned on the major surface 21, such that the flat side 11 of the rectilinear cavity 5 that will be formed in the exposed portion 40 of the major surface at will align with the diagonal of the second pyramidal cavity. When the rectilinear cavity is formed, the photo-lithographic etching process will remove a portion of the substrate that defined half of the second pyramidal cavity, leaving a second half of the second pyramidal cavity intact. The second half of the second pyramidal cavity defines notch 33 and the diagonal of the second pyramidal cavity defines diagonal 50.

Using a single substrate 3 in the micro-photonics module 1 offers the advantages of mass production using photo-lithographic masking and etching techniques that are well known in the semi-conductor industry. The substrates 3 can be made with high accuracy and a large number of the substrate 3 can be made from a single silicon wafer using batch processing, thus further reducing fabrication costs. In addition, the rectilinear cavity 5 and the locator surface 10 allow an optical component 17 to be quickly, cheaply and accurately aligned with optical path 15. Similarly the pyramidal cavity 19 provides a robust mounting for the ball lens 29 while passively aligning the ball lens along the optical path 19 with great accuracy. The invention offers the additional advantage of being testable as a complete photonics module prior to final packaging.

Although several specific embodiments of the invention have been described and illustrated, the invention is not to be limited to the specific forms or arrangements of the parts so described and illustrated. The invention is limited only by the claims.

I claim:

1. A micro-photonics module, comprising:
    a substrate having a substantially contiguous and uniform crystal lattice structure, the substrate having a major surface, the substrate defining a rectilinear cavity extending thereinto from the major surface, the rectilinear cavity having a flat bottom and a flat side;
    a photonics device mounted on the major surface of the substrate in a predefined alignment relative to the rectilinear cavity, the photonics device defining an optical path extending therefrom substantially parallel to the major surface of the substrate, the optical path extending across the rectilinear cavity; and
    an optical component having portions abutting the flat bottom and flat side of the rectilinear cavity, the flat bottom and flat side aligning the optical component relative to the optical path, the flat bottom aligning the optical component in a first direction perpendicular to the flat bottom, the flat side aligning the optical component in a second direction perpendicular to the flat side,
    wherein the substrate additionally defines a locator surface within the rectilinear cavity the locator surface contacting the optical component and aligning the optical component in a third direction perpendicular to the first direction and the second direction.

2. The micro-photonics module of claim 1, wherein the photonics device is one of a semiconductor laser and a semiconductor photo detector.

3. The micro-photonics module of claims 1, wherein the optical component is one of an optical filter, an optical isolator, a mirror and a lens.

4. The micro-photonics module of claim 1, wherein the optical component is bonded to one of the flat bottom and flat side of the rectilinear cavity.

5. The micro-photonics module of claim 1, wherein:
    the substrate includes crystalline silicon;
    the major surface of the substrate is a <100> crystallographic plane;
    the flat bottom is a <100> crystallographic plane;
    the flat side is a <100> crystallographic plane; and
    the locator surface is a <111> crystallographic plane.

6. A micro-photonics module, comprising:
    a substrate having a substantially contiguous and uniform crystal lattice structure, the substrate having a major surface, the substrate defining:
        a rectilinear cavity extending thereinto from the major surface, the rectilinear cavity having a flat bottom and a flat side, and
        a pyramidal cavity extending thereinto from the major surface;
    a photonics device mounted on the major surface of the substrate in a predefined alignment relative to the rectilinear cavity, the photonics device defining an optical path extending therefrom substantially parallel to the major surface of the substrate, the optical path extending across the rectilinear cavity and the pyramidal cavity; and
    an optical component having portions abutting the flat bottom and flat side of the rectilinear cavity, the flat bottom and flat side aligning the optical component relative to the optical path, the flat bottom aligning the optical component in a first direction perpendicular to the flat bottom, the flat side aligning the optical component in a second direction perpendicular to the flat side.

7. The micro-photonics module of claim 6, wherein:
    the substrate includes crystalline silicon;
    the major surface of the substrate is a <100> crystallographic plane;
    the flat bottom is a <100> crystallographic plane;
    the flat side is a <100> crystallographic plane; and
    the pyramidal cavity is bounded by <111> crystallographic planes.

8. The micro-photonics module of claim 6, wherein the pyramidal cavity is oriented with the optical path aligned along a diagonal of the pyramidal cavity.

9. The micro-photonics module of claim 6, wherein the photonics device is one of a semiconductor laser and a semiconductor photo detector.

10. The micro-photonics module of claim 6, wherein the optical component is one of an optical filter, an optical isolator, a mirror and a lens.

11. The micro-photonics module of claim 6, additionally comprising:

a ball lens, the ball lens contacting the substrate at at least three contact points located within the pyramidal cavity, the contact points locating the ball lens in a predefined relationship with the optical path.

12. The micro-photonics module of claim 11, wherein the photonics device is one of a semiconductor laser and a semiconductor photo detector, and the optical component is one of an optical filter, an optical isolator, a mirror and a lens.

13. The micro-photonics module of claim 12, wherein the substrate additionally defines a notch extending thereinto from the major surface and the flat side of the rectilinear cavity, the notch being aligned with the optical path.

14. The micro-photonics module of claim 13, wherein:

the substrate includes crystalline silicon;

the major surface of the substrate is a <100> crystallographic plane;

the pyramidal cavity is bounded by <111> crystallographic planes; and the notch is bounded by <111> crystallographic planes.

15. The micro-photonics module of claim 11, wherein the ball lens is bonded to the substrate.

16. The micro-photonics module of claim 11, wherein the substrate additionally defines a notch extending thereinto from the major surface and the flat side of the rectilinear cavity, the notch being aligned with the optical path.

17. The micro-photonics module of claim 16, wherein:

the substrate includes crystalline silicon;

the major surface of the substrate is a <100> crystallographic plane;

the pyramidal cavity is bounded by <111> crystallographic planes; and the notch is bounded by <111> crystallographic planes.

18. A micro-photonics module, comprising:

a substrate having a substantially contiguous and uniform crystalline lattice structure, the substrate having a major surface, the substrate defining:

a rectilinear cavity extending thereinto from the major surface, the rectilinear cavity having a flat bottom and a flat side, a pyramidal cavity extending thereinto from the major surface, a notch extending thereinto from the major surface and the flat side of the rectilinear cavity, and a locator surface within the rectilinear cavity;

a photonics device mounted on the major surface of the substrate in a predefined alignment relative to the rectilinear cavity, the photonics device defining an optical path extending therefrom substantially parallel to the major surface of the substrate, the optical path extending across the rectilinear cavity, the pyramidal cavity, and the notch;

a ball lens, the ball lens contacting the substrate at at least three contact points located within the pyramidal cavity, the contact points locating the ball lens in a predefined relationship with the optical path; and an optical component having portions abutting the flat bottom of the rectilinear cavity, the flat side of the rectilinear cavity, and the locator surface, the flat bottom, flat side, and locator surface aligning the optical component relative to the optical path, the flat bottom aligning the optical component in a first direction perpendicular to the flat bottom, the flat side aligning the optical component in a second direction perpendicular to the flat side, and the locator surface aligning the optical component in a direction perpendicular to the first direction and the second direction.

19. The micro-photonics module of claim 18, wherein:

the substrate includes crystalline silicon;

the major surface of the substrate is a <100> crystallographic plane;

the flat bottom is a <100> crystallographic plane;

the flat side is a <100> crystallographic plane;

the pyramidal cavity is bounded by <111> crystallographic planes;

the notch is bounded by <111> crystallographic planes; and the locator surface is a <111> crystallographic plane.

* * * * *